United States Patent
Park et al.

(10) Patent No.: US 8,982,706 B2
(45) Date of Patent: Mar. 17, 2015

(54) COMMUNICATION TECHNIQUE FOR A REPEATER USING A TRANSMISSION INDICATOR

(75) Inventors: Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 745 days.

(21) Appl. No.: 13/265,804

(22) PCT Filed: Apr. 15, 2010

(86) PCT No.: PCT/KR2010/002329
§ 371 (c)(1),
(2), (4) Date: Oct. 21, 2011

(87) PCT Pub. No.: WO2010/123220
PCT Pub. Date: Oct. 28, 2010

(65) Prior Publication Data
US 2012/0039243 A1 Feb. 16, 2012

Related U.S. Application Data

(60) Provisional application No. 61/171,440, filed on Apr. 21, 2009, provisional application No. 61/182,083, filed on May 28, 2009, provisional application No. 61/183,061, filed on Jun. 1, 2009.

(30) Foreign Application Priority Data

Apr. 12, 2010 (KR) .................. 10-2010-0033272

(51) Int. Cl.
*G01R 31/08* (2006.01)
*H04B 7/14* (2006.01)
*H04B 7/155* (2006.01)
*H04B 7/26* (2006.01)

(52) U.S. Cl.
CPC .............. *H04B 7/155* (2013.01); *H04B 7/2606* (2013.01)
USPC ........................................ 370/236; 370/315

(58) Field of Classification Search
None
See application file for complete search history.

(56) References Cited

U.S. PATENT DOCUMENTS

| | | | |
|---|---|---|---|
| 2008/0070582 A1 | 3/2008 | Cai | |
| 2008/0298390 A1* | 12/2008 | Kneckt et al. | 370/468 |
| 2009/0252077 A1* | 10/2009 | Khandekar et al. | 370/312 |
| 2010/0080139 A1* | 4/2010 | Palanki et al. | 370/252 |
| 2010/0110964 A1* | 5/2010 | Love et al. | 370/312 |
| 2010/0272006 A1* | 10/2010 | Bertrand et al. | 370/315 |

OTHER PUBLICATIONS

Mitsubishi Electric, "Discussion on coordination of relay nodes for LTE-Advanced", 3GPP TSG RAN WG1 #56bis meeting. R1-091148, Mar. 2009.

* cited by examiner

*Primary Examiner* — Christine Duong
(74) *Attorney, Agent, or Firm* — Lee, Hong, Degerman, Kang & Waimey

(57) ABSTRACT

To prevent the self-interference of an inband relay node, a base station transmits a transmission indication on the downlink of a Un interface. Only when the base station receives an ACKnowledgment (ACK) signal in response to the transmission indication from the relay node, the base station transmits a Un interface downlink signal to the relay node in a specific time area. The time area allocated by the transmission indication may be a time area added to a statically allocated time area.

10 Claims, 17 Drawing Sheets

COMMUNICATION TECHNIQUE FOR A REPEATER USING A TRANSMISSION INDICATOR

CROSS-REFERENCE TO RELATED APPLICATIONS

This application is the National Stage filing under 35 U.S.C. 371 of International Application No. PCT/KR2010/002329, filed on Apr. 15, 2010, which claims benefit of earlier filing date and right of priority to Korean Application No. 10-2010-0033272, filed on Apr. 12, 2010, and also claims the benefit of U.S. Provisional Application Nos. 61/171,440, filed on Apr. 21, 2009, 61/182,083, filed on May 28, 2009, and 61/183,061, filed on Jun. 1, 2009, the contents of which are all hereby incorporated by reference herein in their entirety.

TECHNICAL FIELD

The present invention relates to a method for efficiently conducting communication using a transmission indication at an inband Relay Node (RN) in a mobile communication system including a Base Station (BS), an RN, and a User Equipment (UE).

BACKGROUND ART

Long Term Evolution (LTE) is an evolution of Universal Mobile Telecommunications System (UMTS), standardized by an international standardization body, 3$^{rd}$ Generation Partnership Project (3GPP). The configuration of an LTE system is illustrated in FIG. 1.

FIG. 1 is a view referred to for describing the configuration of an LTE system.

The LTE system may be divided largely into an Evolved UMTS Terrestrial Radio Access Network (E-UTRA) and an Evolved Packet Core (EPC). The E-UTRAN includes UEs and evolved Node Bs (eNBs). A UE is connected to an eNB via a Uu interface and one eNB is connected to another eNB via an X2 interface. The EPC includes a Mobility Management Entity (MME) responsible for control-plane (C-plane) functions and a Serving GateWay (S-GW) responsible for user-plane (U-plane) functions. An eNB is connected to the MME via an S1-MME interface and an eNB is connected to the S-GW via an S1-U interface. These two interfaces are collectively called an S1 interface.

For the Uu interface being an air interface, a radio interface protocol stack is defined. The radio interface protocol stack horizontally includes a PHYsical (PHY) layer, a data link layer, and a network layer and vertically includes a U-plane for user data transmission and a C-plane for control signaling. Based on the lowest three layers of the Open System Interconnection (OSI) reference model known in communication systems, this radio protocol stack can be divided into Layer 1 (L1) including a PHY layer, Layer 2 (L2) including a Medium Access Control/Radio Link Control/Packet Data Convergence Protocol (MAC/RLC/PDCP) layer, and Layer 3 (L3) including a Radio Resource Control (RRC) later. These layers are defined in pairs between a UE and an Evolved UTRAN (E-UTRAN), for data transmission via the Uu interface.

Now a description will be given below of a Long Term Evolution Advanced (LTE-A) system.

LTE-A is a system developed from LTE to meet the 4$^{th}$ Generation (4G) mobile communication requirements, that is, IMT-Advanced requirements recommended by the International Telecommunication Union-Radio communication sector (ITU-R). The 3GPP which developed the LTE system standard is now actively working on standardization of the LTE-A system.

Major technologies added to the LTE-A system are carrier aggregation for extending a used bandwidth and flexibly using the bandwidth and use of relays for supporting group mobility and enabling user-centered network deployment.

FIG. 2 is a view referred to for describing the concept of a mobile communication system to which relays are added.

A relay or RN relays data between a UE and an eNB. Because communication is not conducted actively between a UE and an eNB that are apart from each other by a long distance in the LTE system, a network node called an RN was introduced between a UE and an eNB to avert the problem in the LTE-A system. An eNB managing an RN is called a Donor eNB (DeNB) and a new interface between the RN and the DeNB is defined as a Un interface, distinguishably from a Uu interface between a UE and a network node. FIG. 2 conceptually illustrates an RN and a Un interface.

The RN functions to manage UEs on behalf of the DeNB. That is, the RN is perceived as the DeNB to the UEs. Thus, the Uu interface between the UE and the RN still uses the conventional Uu interface protocols, MAC/RLC/PDCP/RRC.

From the perspective of the DeNB, the RN is perceived as a UE or an eNB depending on circumstances. That is, when the RN initially accesses the DeNB, it performs random access as done by a UE, because the DeNB is not aware of the existence of the RN. Once the RN is connected to the DeNB, the RN operates like an eNB that manages its connected UEs. Accordingly, Un interface protocols should be defined to include a network protocol function in addition to the functions of the Uu interface protocols. For the Un protocols, the 3GPP is currently discussing functions to be added to each protocol layer or functions to be changed in each protocol later, based on the Uu protocols such as the MAC/RLC/PDCP/RRC protocols.

Hereinbelow, a description will be given of an inband RN and an outband RN.

When a Un interface between a DeNB and an RN and a Uu interface between the RN and a UE operate at different frequencies, the RN is called an outband RN. Since a frequency should be allocated to the Un interface, additional cost is caused for the frequency allocation and operation of the RN. To overcome the shortcomings of the outband RN, the concept of an inband RN was introduced additionally.

FIG. 3 is a view referred to for describing the concept of self-interference that an inband RN may suffer from.

An inband RN operates at the same frequency for a Un interface and a Uu interface. Because the transmitter of the inband RN causes self-interference to the receiver of the inband RN during an inband RN operation as illustrated in FIG. 3, the RN can neither perform downlink reception via the Un interface simultaneously with downlink transmission via the Uu interface nor perform uplink transmission via the Uu interface simultaneously with uplink reception via the Un interface. For example, when the RN transmits data to a UE via a downlink Un interface, its receiver suffers from self-interference caused by the downlink transmission to the UE. Therefore, the RN cannot receive data normally from the DeNB via the downlink Un interface, thereby losing data.

DISCLOSURE

Technical Problem

Accordingly, the following description is given of a method for allocating time areas to a Uu interface and a Un interface using a transmission indication and conducting communication via the Uu and Un interfaces to overcome the above-described self-interference of an inband RN.

In an embodiment of the present invention, a time area allocated by a transmission indication may be used a time area added to a time area permanently allocated to an inband RN.

Technical Solution

In an aspect of the present invention, in a mobile communication system in which communication is conducted between a Base Station (BS) and a Relay Node (RN) via a first interface and between the RN and a User Equipment (UE) via a second interface, a method for conducting communication at the RN includes receiving a downlink transmission indication from the BS on a downlink of the first interface, transmitting to the BS a response signal indicating whether a signal can be received on the downlink of the first interface from the BS in a specific time area (hereinafter, referred to as "T1") on an uplink of the first interface, and receiving a signal on the downlink of the first interface in T1 from the BS, if the response signal is an ACKnowledgment (ACK) signal. The downlink of the first interface and a downlink of the second interface are in the same frequency band and signal reception on the downlink of the first interface and signal transmission on the downlink of the second interface are not performed simultaneously.

If the response signal is a Negative ACK (NACK) signal, a signal may not be received on the downlink of the first interface from the BS.

If a signal is supposed to be transmitted to the UE on the downlink of the second interface in T1, a NACK signal may be transmitted as the response signal to the BS. Likewise, if a time at which a signal is supposed to be transmitted to the UE on the downlink of the second interface in T1 cannot be changed, a NACK signal may be transmitted as the response signal to the BS.

A time area (hereinafter, referred to as "T2") may be preliminarily allocated to the RN, for signal transmission to the UE on the downlink of the second interface, In this case, if an ACK signal is transmitted as a response signal for the downlink transmission indication, T1 for receiving a signal from the BS on the downlink of the first interface may be a time area changed from a predetermined part of T2 to receive a signal from the BS on the downlink of the first interface.

On the other hand, a time area (hereinafter, referred to as "T2") may be preliminarily allocated to the RN, for signal reception from the BS on the downlink of the first interface. If an ACK signal is transmitted as a response signal for the downlink transmission indication, T1 for receiving a signal from the BS on the downlink of the first interface may be a time area added to T2. T2 may be a Multimedia Broadcast multicast service Single Frequency Network (MBSFN) subframe area and if a time point at which a signal is received on the downlink of the first interface for a synchronous Hybrid Automatic Repeat reQuest (HARQ) operation of a specific packet transmission between the BS and the RN is different from T2, T1 may be allocated to the RN by the BS through a downlink transmission indication indicating a time point for receiving a signal for the HARQ operation as T1 and the RN receives a signal for the synchronous HARQ operation in T1 on the downlink of the first interface from the BS. T1 allocated by the downlink transmission indication may be used continuously during a time period of the HARQ operation for the specific packet transmission.

The method may further include transmitting an uplink transmission indication to the BS on the uplink of the first interface, receiving from the BS a response signal indicating whether a signal can be transmitted on the uplink of the first interface to the BS in a specific time area (hereinafter, referred to as "T3") on the downlink of the first interface, and transmitting a signal on the uplink of the first interface in T3 to the BS, if the response signal is an ACK signal. The uplink of the first interface and an uplink of the second interface may in the same frequency band and signal transmission on the uplink of the first interface and signal reception on the uplink of the second interface may not be performed simultaneously.

A time area (hereinafter, referred to as "T4") may be preliminarily allocated to the RN, for signal transmission to the BS on the uplink of the first interface, and if an ACK signal is received as a response signal for the uplink transmission indication, T3 for transmitting a signal to the BS on the uplink of the first interface may be a time area added to T4.

In another aspect of the present invention, in a mobile communication system in which communication is conducted between a BS and an RN via a first interface and between the RN and a UE via a second interface, a method for conducting communication at the BS includes transmitting a downlink transmission indication to the RN on a downlink of the first interface, receiving from the RN a response signal indicating whether the RN can receive on the downlink of the first interface a signal in a specific time area (hereinafter, referred to as "T1") on an uplink of the first interface, and transmitting a signal on the downlink of the first interface in T1 to the RN, if the response signal is an ACK signal. The downlink of the first interface and a downlink of the second interface are in the same frequency band and signal transmission from the BS on the downlink of the first interface and signal transmission from the RN on the downlink of the second interface are not performed simultaneously.

The BS may preliminarily allocate to the RN a time area (hereinafter, referred to as "T2") for signal reception from the BS on the downlink of the first interface, and if an ACK signal is received as a response signal for the downlink transmission indication, T1 for transmitting a signal to the RN on the downlink of the first interface may be a time area added to T2.

The method may further include receiving an uplink transmission indication from the RN on the uplink of the first interface, transmitting to the RN a response signal indicating whether a signal can be received on the uplink of the first interface from the RN in a specific time area (hereinafter, referred to as "T3") on the downlink of the first interface, and receiving a signal on the uplink of the first interface in T3 from the RN, if the response signal is an ACK signal. The uplink of the first interface and an uplink of the second interface may be in the same frequency band and signal reception at the BS on the uplink of the first interface and signal reception at the RN on the uplink of the second interface may not be performed simultaneously.

The BS may preliminarily allocate to the RN a time area (hereinafter, referred to as "T4") for signal transmission to the BS on the uplink of the first interface, and if an ACK signal is transmitted as a response signal for the uplink transmission indication, T3 for receiving a signal from the RN on the uplink of the first interface may be a time area added to T4.

In another aspect of the present invention, in a mobile communication system in which communication is conducted between a BS and an RN via a first interface and between the RN and a UE via a second interface, an RN apparatus for conducting communication includes an antenna module for receiving a signal from the BS on a downlink of the first interface, transmitting a signal to the BS on an uplink of the first interface, receiving a signal from the UE on an uplink of the second interface, and transmitting a signal to the UE on a downlink of the second interface, and a processor for processing the signals received at the antenna module and the signals transmitted through the antenna module. Upon receipt of a downlink transmission indication from the BS on the downlink of the first interface through the antenna module, the processor controls a response signal indicating whether a signal can be received on the downlink of the first interface from the BS in a specific time area (hereinafter, referred to as "T1") to be transmitted to the BS on the uplink of the first interface, and if the response signal is an ACK signal, and the processor controls a signal to be received on the downlink of the first interface in T1 from the BS. The downlink of the first interface and a downlink of the second interface are in the same frequency band and signal reception on the downlink of the first interface and signal transmission on the downlink of the second interface are not performed simultaneously.

In a further aspect of the present invention, in a mobile communication system in which communication is conducted between a BS and an RN via a first interface and between the RN and a UE via a second interface, a BS apparatus for conducting communication includes an antenna module for transmitting a signal to the RN on a downlink of the first interface and receiving a signal from the RN on an uplink of the first interface, and a processor for processing the signal received at the antenna module and the signal transmitted through the antenna module. The processor controls a downlink transmission indication to be transmitted to the RN on the downlink of the first interface, the processor controls a response signal indicating whether the RN can receive a signal on the downlink of the first interface in a specific time area (hereinafter, referred to as "T1") to be received from the RN on the uplink of the first interface, and if the response signal is an ACK signal, the processor controls a signal to be transmitted to the RN on the downlink of the first interface in T1. The downlink of the first interface and a downlink of the second interface are in the same frequency band and signal transmission from the BS apparatus on the downlink of the first interface and signal transmission from the RN on the downlink of the second interface are not performed simultaneously.

Advantageous Effects

According to the embodiments of the present invention, the self-interference of an inband RN can be eliminated efficiently.

Furthermore, resources can be utilized more flexibly by using the embodiments of the present invention in combination with a scheme that uses permanently allocated resources.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 is a view referred to for describing the concept of self-interference that an inband RN may suffer from;

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to one of $3^{rd}$ Generation partnership Project (3GPP) Long Term Evolution (LTE) series of standards is being used. However, the description is applicable to any other mobile communication system except for specific features inherent to the 3GPP LTE series of standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term User Equipment (UE) generically refers to a mobile or fixed user terminal device such as a Mobile Station (MS). In addition, the term Base Station (BS) generically refers to any node at a network end which communicates with a UE, such as a Node B, an eNode B, etc. The afore-described term Relay Node (RN) may also be called a relay or a relay device. The downlink and uplink of a Un interface will be referred to shortly as a DL Un and a UL Un, respectively and the downlink and uplink of a Uu interface will be referred to shortly as a DL Uu and a UL Uu.

In the following description, it is proposed that a Donor eNB (DeNB) allocates an RN identifier (herein, referred to as an RN-Radio Network Temporary Identifier (RN-RNTI)) to an RN in order to identify the RN. An RN-RNTI is an identifier that identifies a single RN on a cell basis. Alternatively or additionally, one or more RNs selected from among RNs located within the same cell may be grouped and the DeNB may allocate an RN-RNTI to the RN group so as to identify the RN group.

The DeNB allocates an RN-RNTI to an RN during Radio Resource Control (RRC) connection setup and the RN may deallocate the RN-RNTI during RRC connection release. A special RN-RNTI allocated to an RN by the DeNB may last even during RRC connection release between the RN and the DeNB.

Now a description will be given of a method for using a transmission indication according to an embodiment of the present invention, based on the above description.

Figure 1:
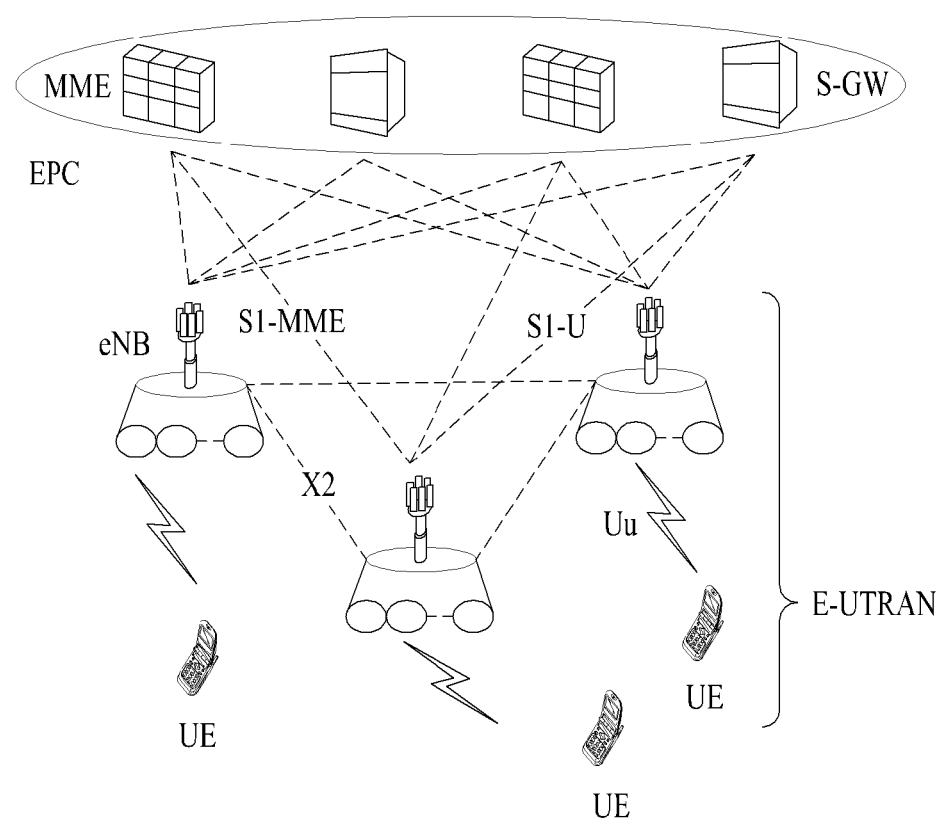
FIG. 1 is a view referred to for describing the configuration of a Long Term Evolution (LTE) system.
Figure 2:
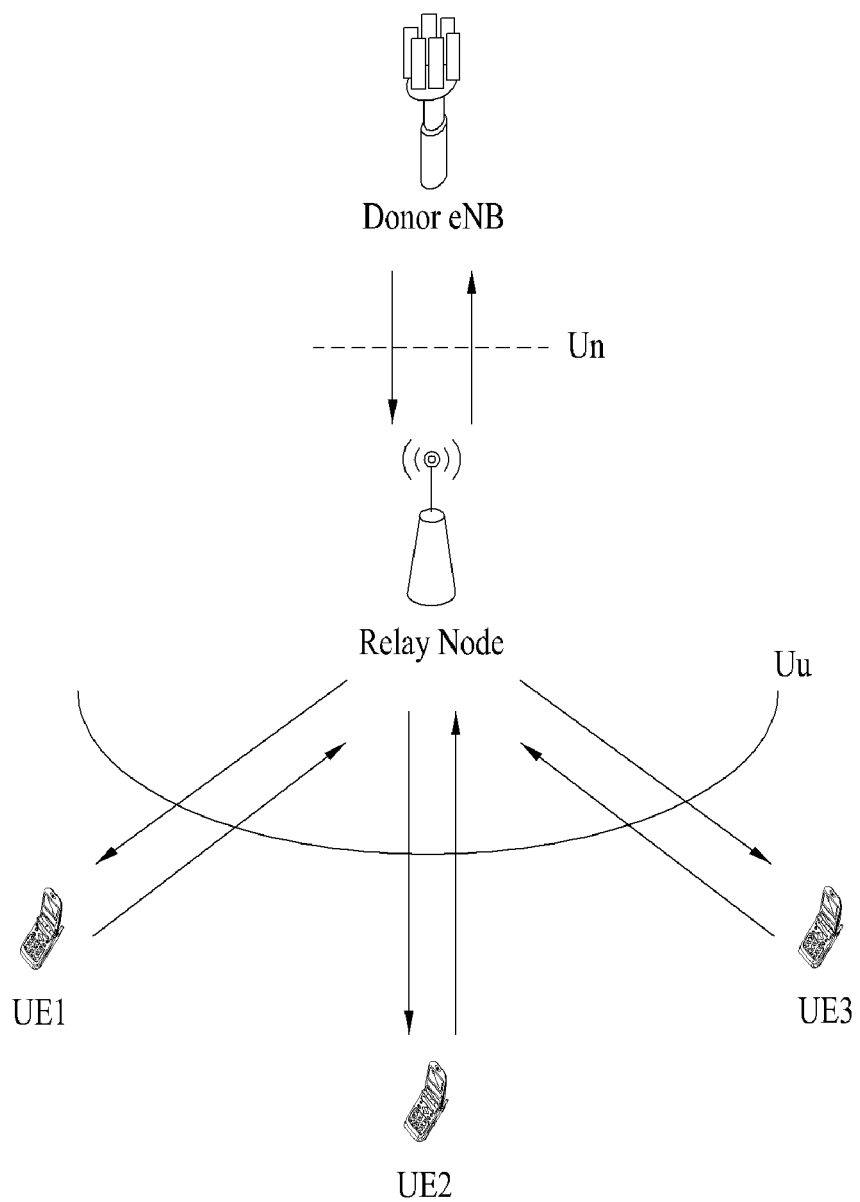
FIG. 2 is a view referred to for describing the concept of a mobile communication system added with Relay Nodes (RNs)
Figure 3:
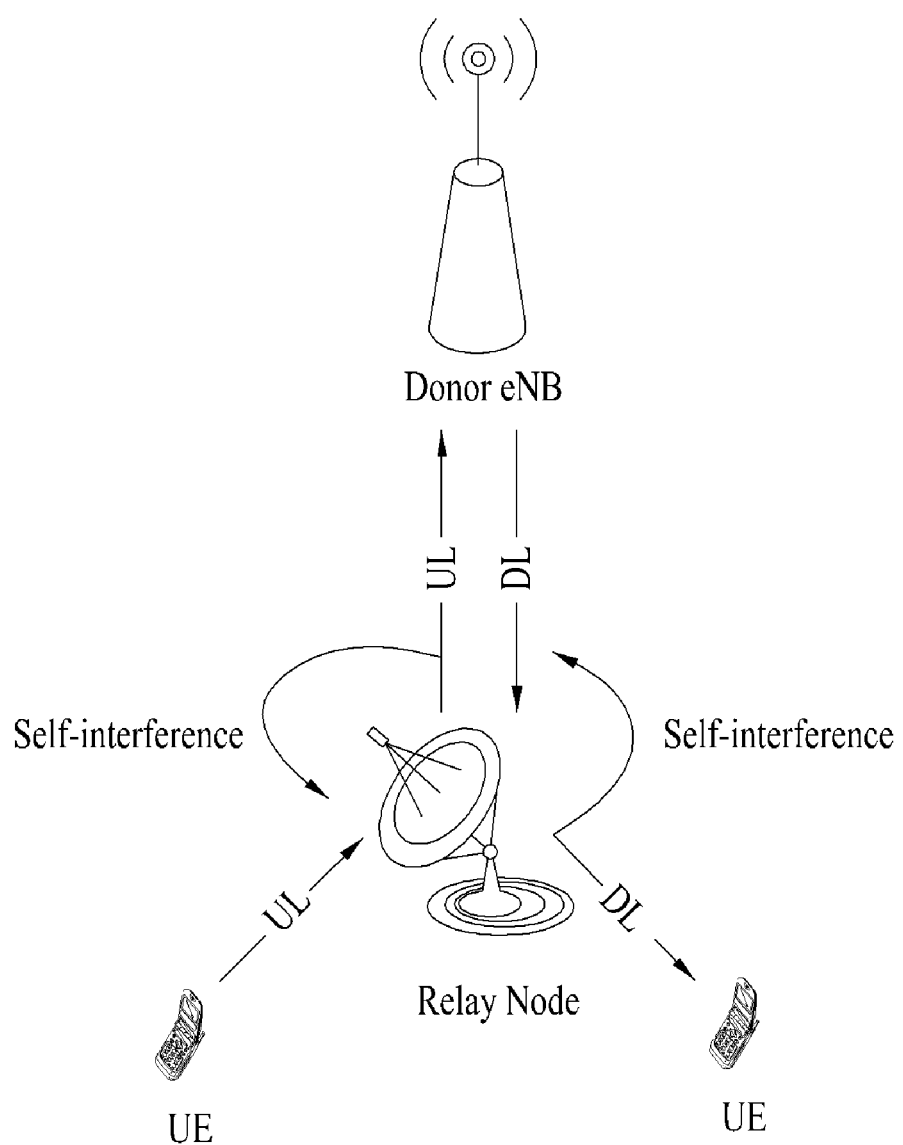
Figure 4:
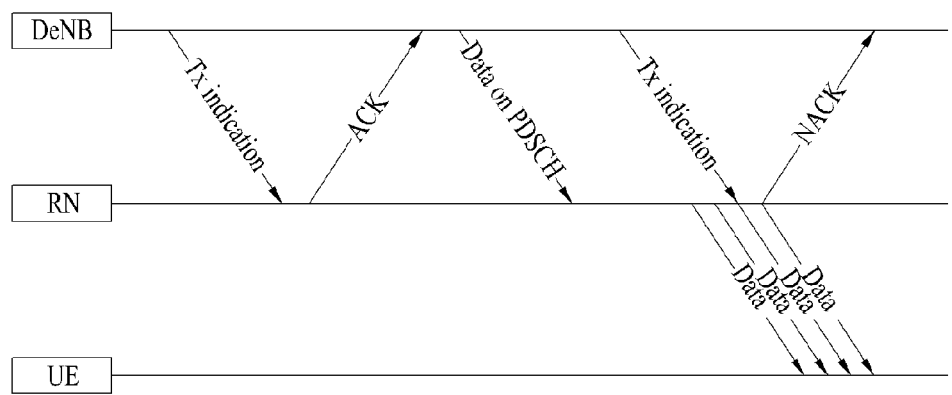
FIG. 4 illustrates a method for using a downlink transmission indication for a Un interface according to an embodiment of the present invention.

FIG. 4 illustrates a method for using a transmission indication for a DL Un according to an embodiment of the present invention.

S401: a DeNB may transmit a Transmission (Tx) indication to an RN. In accordance with the embodiment of the present invention, the DeNB uses the Tx indication to determine whether the RN can receive data via a DL Un at a specific time point. The Tx indication may include information about a time point when the DeNB is supposed to transmit data to the RN via the DL Un. On the other hand, a time for data transmission may be fixed or preset with respect to the Tx indication transmitted by the DeNB. For example, the DeNB may signal to the RN preliminarily that data will be transmitted "x" Transmission Time Intervals (TTIs) after the reception time of the Tx indication by an RRC message, for example. In addition, the Tx indication may include information about radio resources (time, frequency, code, etc.) in which the data will be transmitted. Meanwhile, a typical Physical Downlink Control Channel (PDCCH) format for carrying downlink allocation information may be adopted for the Tx indication. In this case, the downlink allocation information may include another indication indicating that this is a Tx indication requiring a receiver to transmit a response signal.

S402: upon receipt of the Tx indication, the RN may transmit a Negative ACKnowledgment (NACK) signal for the Tx indication to the DeNB, if the RN determines that it needs to transmit data via a DL Uu at the data transmission time indicated by the Tx indication. On the other hand, in the absence of data to be transmitted via the DL Uu or if the RN can discontinue data transmission via the DL Uu when needed, the RN may transmit an ACK signal for the Tx indication to the DeNB.

The RN may make a decision as to whether it is necessary to transmit data via the DL Uu at the time of receiving data via the DL Un indicated by the Tx indication in the following manner.

(1) The RN may prioritize UEs and determine that data transmission to UEs with a specific priority level is mandatory. For the remaining UEs, the RN may determine to discontinue data transmission to the remaining UEs. If the RN determines to discontinue data transmission to the UE, the RN may transmit an ACK signal for the Tx indication to the DeNB.

(2) The RN may determine whether data transmission is mandatory or can be discontinued, taking into account the priority level of data transmitted via the DL Un. If the priority level of data to be transmitted at a time indicated by the Tx indication (or the priority level of a logical channel on which the data will be transmitted) is higher than a predetermined priority level, the RN determines that the data transmission is necessary. If the priority level of the data is lower than the predetermined priority level, the RN determines to discontinue the data transmission via the DL Uu. If the RN determines to discontinue data transmission to the UE, the RN may transmit an ACK signal for the Tx indication to the DeNB.

(3) The RN may make the determination according to the amount of data to be transmitted via the DL Un. For instance, if more data than a predetermined amount is to be transmitted at the time indicated by the Tx indication, the RN may determine to transmit data via the DL Uu at the time. If as much data as or less data than the predetermined amount is to be transmitted, the RN may determine to discontinue the data transmission via the DL Uu. The data amount may be set with respect to one or more UEs.

One or more of the above methods for determining whether data is to be transmitted via a DL Uu may be set for an RN by a DeNB.

In the illustrated case of FIG. 4, it is assumed that the RN transmits an ACK signal for the Tx indication to the DeNB.

S403: if the RN transmits an ACK signal to the DeNB in response to the Tx indication, the DeNB may transmit data to the RN on a Physical Downlink Shared Channel (PDSCH). That is, the DeNB may transmit data to the RN based on radio resource information indicated by the Tx indication. The RN may also receive the data from the DeNB on the PDSCH of the Un using the radio resource information indicated by the Tx indication.

S04, S405 and S406: upon receipt of a Tx indication from the DeNB, if a signal transmission via the DL Uu is scheduled or cannot be discontinued at a time indicated by the Tx indication, the RN may transmit a NACK signal for the Tx indication to the DeNB and thus may transmit a signal to the UE via the DL Uu at the time.

Another embodiment of the present invention provides a method for conducting communication at a specific time point allocated dynamically by a Tx indication, in the case where a resource area is statically allocated to each interface.

Figure 5:
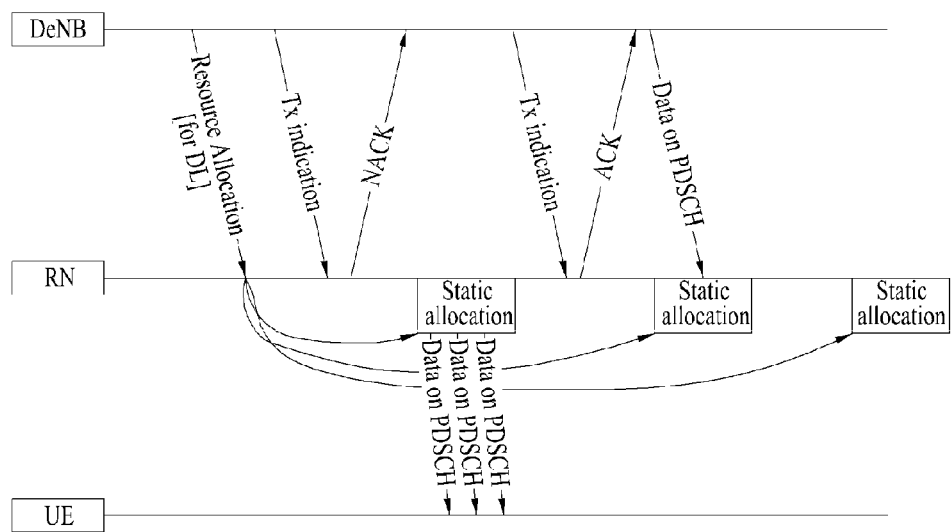
FIG. 5 illustrates a method for securing an additional time area for receiving a signal via a downlink Un interface (DL Un) using a transmission indication according to an embodiment of the present invention.

FIG. 5 illustrates a method for securing an additional time area for receiving a signal via a DL Un using a Tx indication according to an embodiment of the present invention.

S501: the DeNB may statically allocate to the RN a time or radio resources for data transmission to a UE. To be more specific, the DeNB may preset a time interval during which the RN can transmit data to a UE via a DL Uu and a time interval during which the RN can receive data from the DeNB via a DL Un, according to a predetermined pattern and may signal the predetermined pattern to the RN. This configuration information may be transmitted to the RN on a PDCCH or by a Medium Access Control (MAC) or RRC message. In FIG. 5, the configuration information is expressed as "Resource Allocation [for DL]". Likewise, the DeNB may set a data communication period between the DeNB and the RN using, for example, a Multimedia Broadcast multicast service Single Frequency Network (MBSFN) subframe, which will be described later with reference to FIG. 6.

S502: as described above, the RN may transmit data to the UE via the DL Uu in a predetermined time interval according to the statically allocated resource information.

S503: If data is generated to be transmitted to the RN in a specific time interval set for data transmission from the RN to the UE and the DeNB determines that the data transmission is necessary, the DeNB transmits a Tx indication to the RN. The Tx indication may contain radio resource information for use in transmitting data to the RN by the DeNB.

Upon receipt of the Tx indication from the DeNB, the RN determines whether to transmit data to the UE at a transmission time indicated by the Tx indication. The criteria described before with reference to FIG. 4 may still be used in making the determination. That is, if the RN determines that the data transmission to the UE at the transmission time indicated by the Tx indication is not necessary, the RN may transmit an ACK signal to the DeNB in response to the Tx indication. In this case, the DeNB may transmit data to the RN via the DL Uu based on the radio resource information included in the Tx indication. If the RN determines to transmit data to the UE at the transmission time indicated by the Tx indication, the RN may transmit a NACK signal to the DeNB in response to the Tx indication.

In the embodiment illustrated in FIG. 5, the Tx indication transmitted in step S503 may indicate signal transmission from the DeNB at time T1. The RN is assumed to transmit a NACK signal to the DeNB in response to the Tx indication, determining that signal transmission to the UE at time T1 is needed (S504). If the DeNB transmits a Tx indication asking whether signal reception via the DL Un at time T2 is possible (S505) and the RN determines that signal transmission to the UE at time T2 is not necessary or can be discontinued, the RN may transmit an ACK signal to the DeNB (S506) and may receive a PDSCH from the DeNB via the DL Un at time T2.

In another embodiment of the present invention, it is assumed that a resource area is statically allocated for a DL Un.

Figure 6:
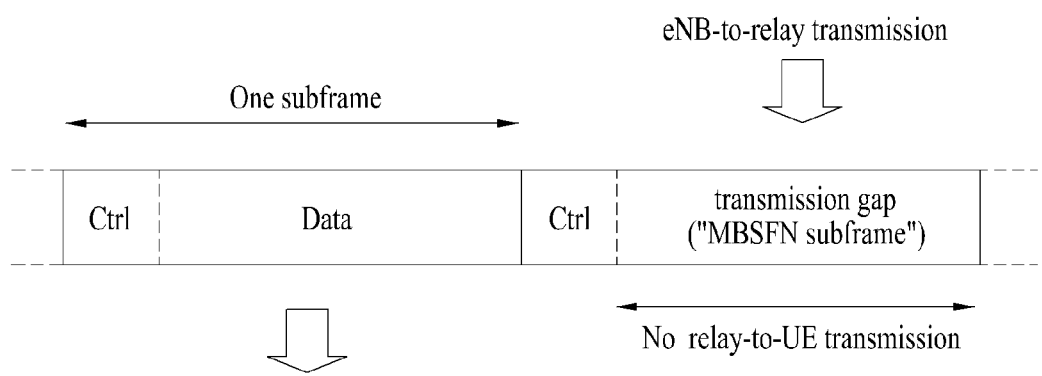
FIG. 6 illustrates a method for statically allocating a DL Un reception time point using a Multimedia Broadcast multicast service Single Frequency Network (MBSFN) subframe according to an embodiment of the present invention.

FIG. 6 illustrates a method for statically allocating a DL Un reception time point using an MBSFN subframe according to an embodiment of the present invention.

Referring to FIG. 6, an MBSFN subframe is statically allocated for a DL Un and the RN is not allowed to transmit a signal to a UE in a time area corresponding to the MBSFN subframe in the embodiment of the present invention. That is, the RN may regard the MBSFN subframe as a transmission gap from the viewpoint of signal transmission via a DL Uu. This MBSFN subframe is statically allocated as a reception time of a signal from the DeNB via the DL Un.

Figure 7:
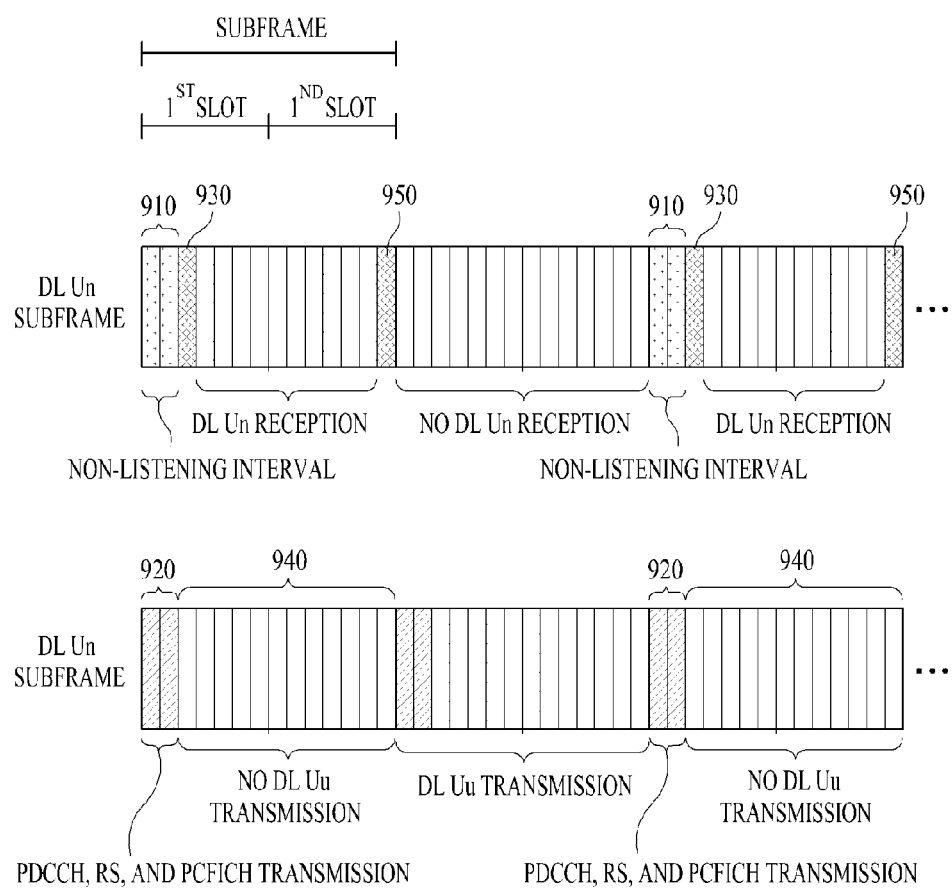
FIG. 7 illustrates a method for statically allocating downlink resource areas for Un and Uu interfaces in a similar manner to the embodiment illustrated in FIG. 6.

As illustrated in FIG. 6, despite an MBSFN subframe, its first two or three Orthogonal Frequency Division Multiplexing (OFDM) symbols are preferably used for transmission of a PDCCH via the DL Uu so that the UE can operate without errors. Similarly to the embodiment of FIG. 6, both DL Un and DL Uu resource areas may be statically allocated as illustrated in FIG. 7.

Even when the DL Un and DL Uu resource areas are statically allocated as described above, partially dynamic resource allocation is implemented using the afore-described Tx indication in accordance with an embodiment of the present invention. This is because the following problems may occur in relation to synchronous Hybrid Automatic Repeat reQuest (HARQ) even when statically allocated resource areas are used.

For instance, setting of an MBSFN subframe and an HARQ operation between a DeNB and an RN will be described below.

For a reason such as transmission of system information, subframes 0, 4, 5 and 9 are not available as MBSFN subframes for the eNB and the RN. In other words, subframes 1, 2, 3, 6, 7 and 8 are available as MBSFN subframes.

Along with the MBSFN subframe setting, the aspect of downlink channel data transmission from the DeNB to the RN will be described.

To transmit data to the RN in an HARQ operation, the DeNB transmits a downlink (DL) assignment and data in the same subframe. The RN transmits an HARQ feedback to the DeNB four subframes after receiving the subframe according to the decoding result of the received data. For example, if the RN receives data from the DeNB in subframe 2, the RN transmits an HARQ feedback for the received data in subframe 6 to the eNB. However, it may occur that the DeNB cannot transmit data to the RN in subframes 1 and 6 due to the afore-described MBSFN subframe setting. That is, the DeNB cannot transmit data to the RN in subframes 1 and 6 irrespective of whether the RN receives data from a UE in subframes 5 and 0.

Along with the MSBSFN subframe setting, the aspect of uplink channel data transmission from the RN to the DeNB will be described.

For the RN to transmit data to the DeNB in an HARQ operation, the DeNB transmits an Uplink (UL) grant to the RN in a specific subframe and the RN transmits data to the DeNB four subframes after receiving the specific subframe. The DeNB transmits an HARQ feedback for the received data to the RN four subframes after receiving the data. For example, if the RN receives a UL grant in subframe 3 of radio frame 0, the RN transmits data to the eNB in subframe 7 of radio frame 0 and the DeNB transmits an HARQ feedback for the received data in subframe 1 of radio frame 1. However, the UL HARQ operation faces a problem due to the above-described MBSFN subframe setting. For example, if the RN receives a UL grant in subframe 1, it transmits data in subframe 5 to the DeNB. However, since subframe 5 cannot be set as an MBSFN subframe, the RN should await data reception from the UE. That is, the eNB is under the constraint that it does not provide a UL grant in subframes 1 and 6 irrespective of whether the RN receives data from a UE in subframes 0 and 5.

Therefore, even through the DL Un and DL Uu resource areas are statically allocated as illustrated in FIGS. 6 and 7, partially dynamic resource allocation is implemented using the afore-described Tx indication in the embodiment of the present invention. For example, in the absence of a statically allocated resource area (or if a resource area is statically allocated for the DL Uu) at a time when it is necessary for the DeNB to transmit a signal to the RN via the DL Un in relation to FIGS. 6 and 7 in a synchronous HARQ operation, the DeNB may determine whether the RN can receive a signal via the DL Un at the transmission time, using a Tx indication. Upon receipt of the Tx indication, if the RN does not need to transmit a signal to the UE at the transmission time or can discontinue the signal transmission to the UE at the transmission time, the RN may transmit an ACK signal to the DeNB in response to the Tx indication and may receive a signal from the DeNB via the DL Uu in a time area which has not been allocated for the DL Un or which has been allocated for the DL Uu by static resource allocation.

Uplink communication using a Tx indication according to another embodiment of the present invention will be described below.

Figure 8:
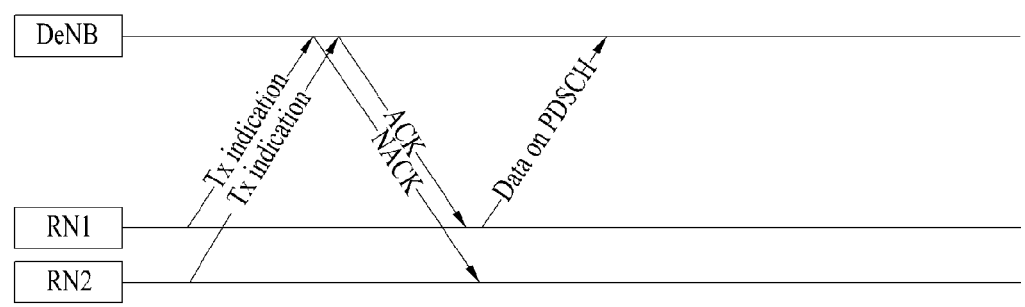
FIG. 8 illustrates an uplink communication method using a transmission indication according to an embodiment of the present invention.

FIG. 8 illustrates an uplink communication method using a Tx indication according to an embodiment of the present invention.

S801: the RN may transmit a Tx indication to the DeNB in the embodiment of the present invention. The Tx indication may be referred to as a UL Tx indication, distinguishably from a Tx indication for downlink transmission. Unless otherwise mentioned, a UL Tx indication is called simply a Tx indication hereinbelow.

The Tx indication may include information about radio resources needed for the RN to transmit data to the DeNB. More specifically, the DeNB may preset a radio resource area available to the RN and signal the radio resource area to the RN. The RN may select radio resources according to the radio resource area available to the RN and the amount of data to be transmitted and may signal the radio resources to the DeNB by the Tx indication. For example, the DeNB sets UL Un radio resources A, B, C and D as available to the RN and signals the UL Un radio resources A, B, C and D to the RN. The RN may select UL Un radio resources A or UL Un radio resources A and B from among the radio resources available to the RN according to the amount of data to be transmitted and may signal the selected UL Un radio resources to the DeNB. As illustrated in FIG. 8, the DeNB may receive Tx indications from a plurality of RNs.

S802: the DeNB may transmit an ACK or NACK signal to the RN in response to the received Tx indication. That is, if the DeNB determines that the RN can use the radio resources indicated by the Tx indication, the DeNB transmits an ACK signal to the RN. If the RN is not allowed to use the radio resources indicated by the Tx indication, the DeNB transmits a NACK signal to the RN. In the embodiment illustrated in FIG. 8, it is assumed that the DeNB transmits an ACK signal to RN1 and a NACK signal to RN2.

S803: upon receipt of the ACK signal for the transmitted Tx indication, RN1 may transmit data to the DeNB on a Physical Uplink Shared Channel (PUSCH) of the UL Un using the radio resource information included in the Tx indication. On the other hand, upon receipt of the NACK signal for the transmitted Tx indication, RN2 does not transmit data to the DeNB at a corresponding transmission time. Therefore, RN2 may cancel the data transmission at the transmission time and retransmit the Tx indication to the DeNB. Retransmission of the Tx indication may be managed using a timer. For example, a Tx indication timer is defined and after receiving the NACK signal from the DeNB, RN2 activates the Tx indication timer. Upon expiration of the Tx indication timer, RN2 retransmits the Tx indication. The DeNB may signal settings related with the Tx indication timer by an RRC message, for example.

If the RN fails to receive both an ACK signal and a NACK signal from the DeNB, the RN may retransmit the Tx indication using another timer. That is, the RN activates the timer after transmitting or retransmitting the Tx indication. When the RN fails to receive a response signal from the DeNB until expiration of the timer, the RN may retransmit the Tx indication. The DeNB may signal settings related to the timer by an RRC message, for example.

A case where a resource area is statically allocated for uplink transmission will be described below.

Figure 9:
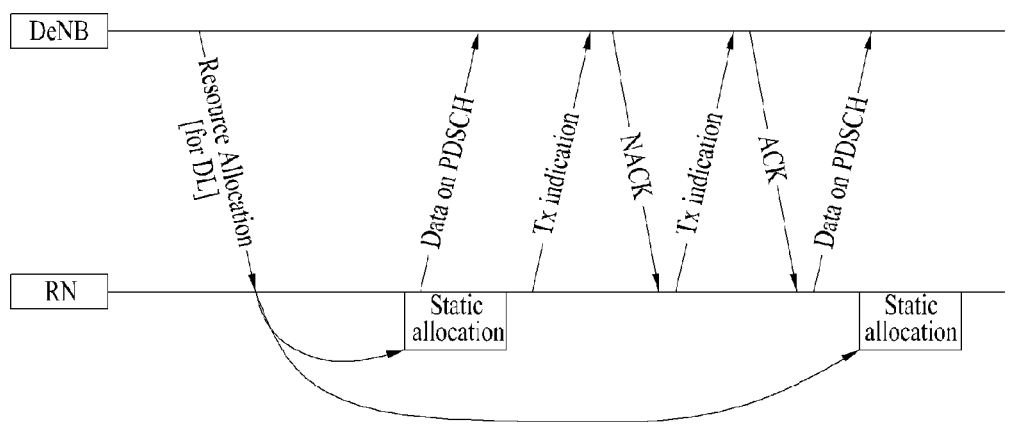
FIG. 9 illustrates an uplink communication method using a transmission indication in the presence of a statically allocated resource area according to an embodiment of the present invention.

FIG. 9 illustrates a method for conducting uplink communication using a Tx indication, in the presence of a statically allocated resource area according to an embodiment of the present invention.

S901: the DeNB statically allocates to the RN a time or radio resources for data transmission via the UL Un. To be more specific, the DeNB presets a time interval during which the RN can transmit data to the DeNB and a time interval during which the RN can receive data from a UE. The DeNB may signal this configuration information to the RN on a PDCCH or by a MAC or RRC message.

S902: upon receipt of the configuration information, the RN may transmit data to the DeNB via the UL Un in a predetermined time interval according to the configuration information.

S903: if the RN determines that it is necessary to transmit data to the DeNB in a time interval other than the statically allocated radio resources, the RN may transmit a Tx indication to the DeNB in the embodiment of the present invention. The Tx indication may contain radio resource information for use in transmitting data to the DeNB by the RN.

S904: upon receipt of the Tx indication from the RN, the DeNB may transmit an ACK or NACK signal to the RN in response to the Tx indication. That is, if the DeNB determines that the RN can use the radio resources indicated by the Tx indication, the DeNB may transmit an ACK signal to the RN. On the other hand, if the RN is not allowed to use the radio resources, the DeNB may transmit a NACK signal to the RN. Upon receipt of the NACK signal for the Tx indication, the RN may cancel data transmission at a corresponding time and retransmit the Tx indication to the DeNB. Retransmission of the Tx indication may be managed using a timer. For example, a Tx indication timer is defined and after receiving the NACK signal from the DeNB, the RN activates the Tx indication timer. Upon expiration of the Tx indication timer, the RN may retransmit the Tx indication. The DeNB may signal settings related with the Tx indication timer by an RRC message, for example.

S905: if the RN fails to receive both an ACK signal and a NACK signal from the DeNB, the RN may retransmit the Tx indication using another timer. That is, the RN activates the timer after transmitting or retransmitting the Tx indication. When the RN fails to receive a response signal from the DeNB until expiration of the timer, the RN may retransmit the Tx indication. The DeNB may signal settings related to the timer by an RRC message, for example.

Figure 10:
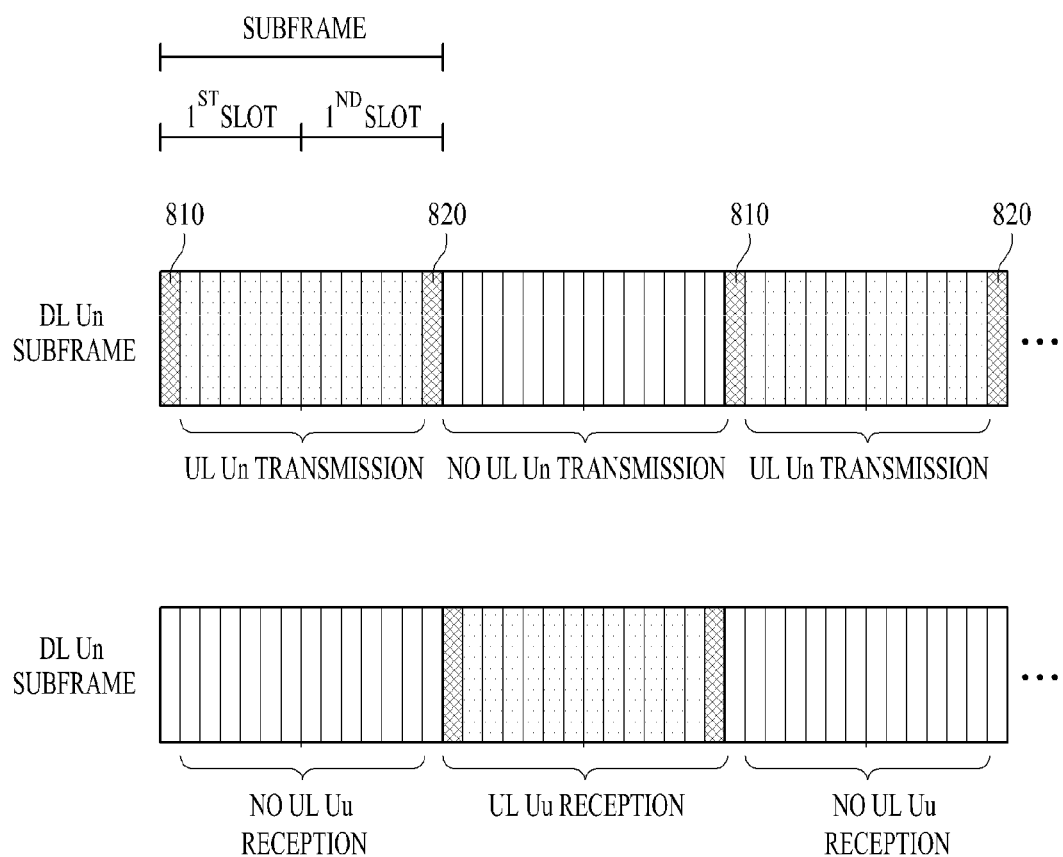
FIG. 10 illustrates a method for statically allocating uplink resources according to an embodiment of the present invention.

FIG. 10 illustrates a method for statically allocating uplink resources according to an embodiment of the present invention.

To prevent the self-interference of an inband RN, a UL Un period and a UL Uu period are allocated as illustrated in FIG. 10. Resources may be allocated statically so that from the perspective of the RN, signal transmission via the UL Un and signal reception via the UL Uu do not take place at the same time. According to this scheme, when the RN needs to transmit a signal via the UL Un in a resource area other than the statically allocated resource area, the RN may be allocated a needed time point or may get an already allocated time point changed, using a Tx indication.

In accordance with another embodiment, the self-interference of an inband RN may be eliminated using a UE Discontinuous Transmission (DTX) order.

Figure 11:
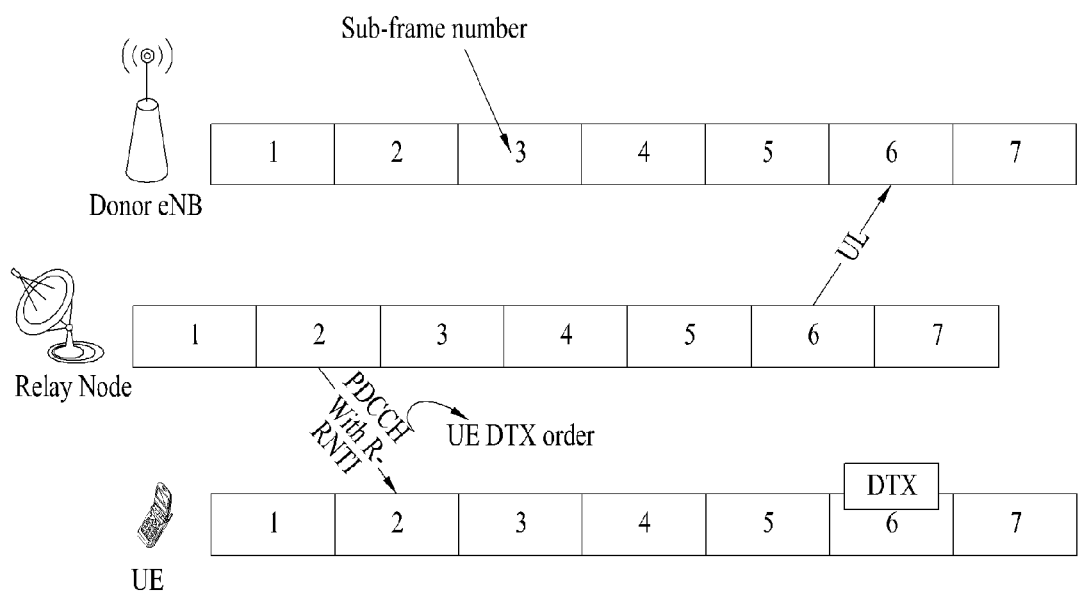
FIG. 11 illustrates a method for conducting communication using a User Equipment (UE) Discontinuous Transmission (DTX) order according to an embodiment of the present invention.

FIG. 11 illustrates a method for conducting communication using a UE DTX order according to an embodiment of the present invention.

In the embodiment of the present invention, when the RN needs to transmit data to the DeNB via the UL Un at a specific time, the RN may transmit a UE DTX order to a UE so as to prevent the UE from transmitting data to the RN via a UL Uu at the specific time. The UE DTX order may indicate the specific time point and may be transmitted to the UE on a PDCCH or by a MAC or RRC message.

The UE DTX order may be transmitted to a particular UE, a plurality of UEs, or commonly to all UEs within a cell. If the UE DTX order is transmitted to a plurality of UEs or all UEs within a cell, it is transmitted using a specific RNTI in the embodiment of the present invention. The RNTI may be an RNTI allocated to the RN by the DeNB or any other RNTI. The RNTI may be signaled to the UEs connected to the RN by system information, on a PDCCH, or by a MAC or RRC signal.

Upon receipt of the UE DTX order, the UEs do not transmit data to the RN irrespective whether the UEs need to transmit data to the RN via the UL Uu at a time indicated by the UE DTX order.

The configuration of an RN or a DeNB for implementing the above-described operations will be described below.

Figure 12:
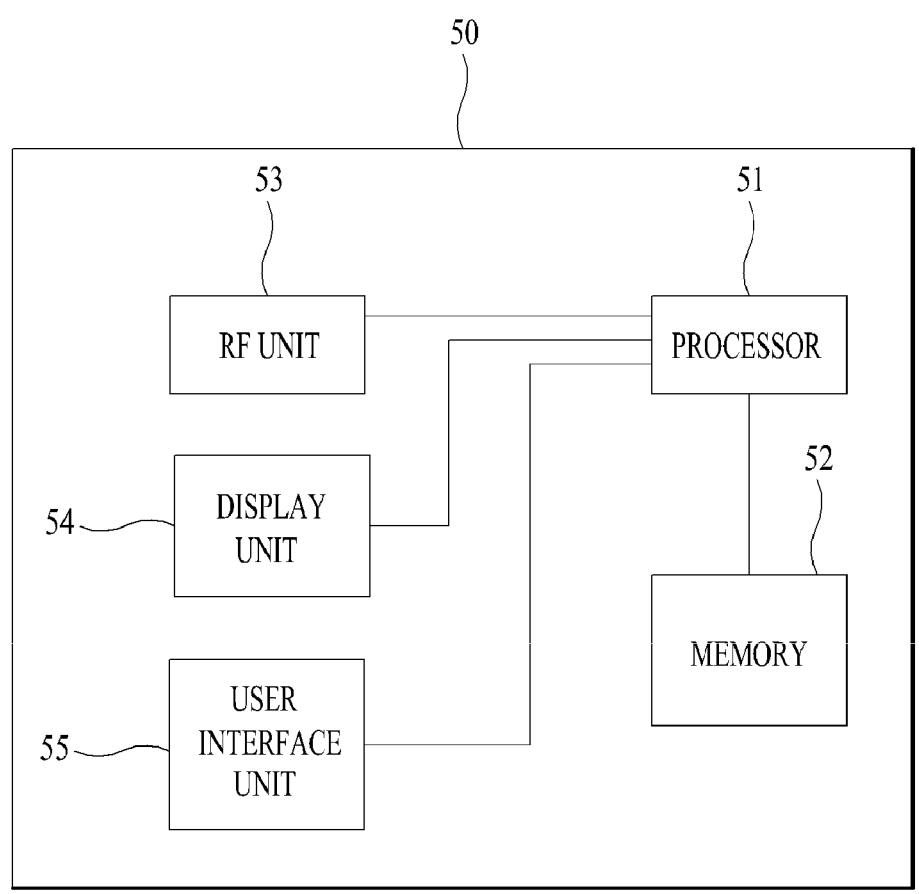
FIG. 12 is a block diagram of an RN or Donor eNode B (DeNB) apparatus according to an embodiment of the present invention.

FIG. 12 is a block diagram of an RN or DeNB apparatus according to an embodiment of the present invention.

Referring to FIG. 12, an apparatus 50 may be a UE, an RN, or a macro BS which has been described before in the embodiments of the present invention. If this apparatus 50 is an RN apparatus, a Radio Frequency (RF) unit 53 may include an antenna module (not shown) for receiving a signal from the DeNB via the DL Un, transmitting a signal to the DeNB via the UL Un, receiving a signal from the UE via the UL Uu, and transmitting a signal to the UE via the DL Uu.

The apparatus 50 may include a processor 51, a memory 52, the RF unit 53, a display unit 54, and a user interface unit 55. Radio interface protocol layers are implemented in the processor 51. The processor 51 provides a C-plane and a U-plane. The functions of each layer may be implemented in the processor 51, which will be described later in great detail. The memory 52 is connected to the processor 51 and stores an Operating System (OS), applications, and general files.

If the apparatus 50 is a UE, the display unit 54 may display various types of information and may adopt a known component such as a Liquid Crystal Display (LCD), an Organic Light Emitting Diode (OLED), etc. The user interface unit 55 may be configured by combining known user interfaces such as a keypad, a touch screen, etc. The RF unit 53 may be connected to the processor 51 and may transmit and receive radio signals. The RF unit 53 may be divided into a Transmission (Tx) module and a Reception (Rx) module.

Figure 13:
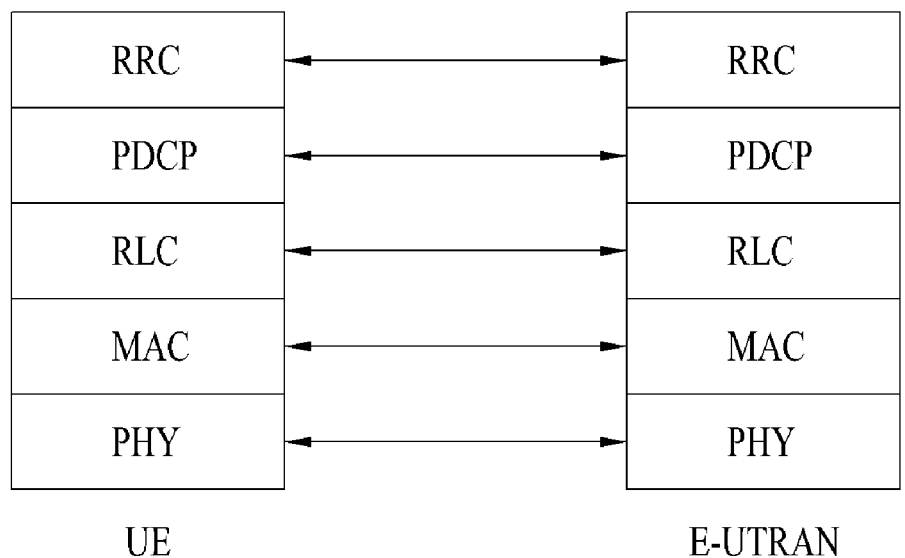
FIGS. 13 and 14 illustrate the structure of a processor in an apparatus according to an embodiment of the present invention.
Figure 14:
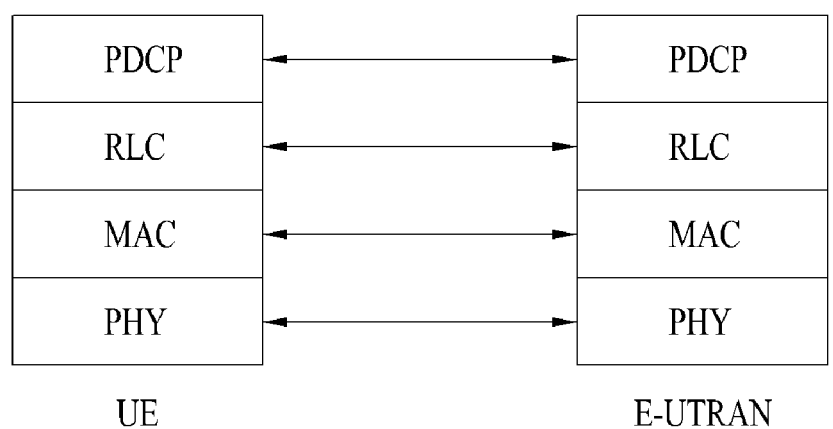

FIGS. 13 and 14 illustrate the configuration of the processor in the apparatus according to an embodiment of the present invention.

Specifically, FIG. 13 illustrates the C-plane architecture of the processor 51 and FIG. 14 illustrates the U-plane architecture of the processor 51. Now, the layered structure of each plane will be described below.

At L1, the PHY layer provides information transfer service to its higher layer on physical channels. The PHY layer is connected to the MAC layer through transport channels and data is transferred between the MAC layer and the PHY layer on the transport channels. The transport channels are largely divided into dedicated transport channels and common transport channels depending on whether the transport channels are shared or not. Data is transmitted on physical channels using radio resources between different PHY layers, that is, the PHY layers of a transmitter and a receiver.

There are a plurality of layers at L2. The MAC layer maps logical channels to transport channels and performs logical channel multiplexing by mapping a plurality of logical channels to one transport channel. The MAC layer is connected to its higher layer, the RLC layer through logical channels. Depending on the types of information carried on the logical channels, the logical channels are classified into control channels that deliver C-plane information and traffic channels that deliver U-plane information.

The RLC layer at L2 adjusts a data size to be suitable for data transmission in the air interface from a lower layer by segmenting and concatenating data received from a higher layer. In order to guarantee various Quality of Service (QoS) requirements of each Radio Bearer (RB), the RLC layer provides three operation modes, Transparent Mode (TM), Unacknowledged Mode (UM), and Acknowledged Mode (AM). Especially, an AM RLC performs a retransmission function through ARQ, for reliable data transmission.

The PDCP layer at L2 compresses a header to reduce the size of an Internet Protocol (IP) packet header of a relatively large size containing unnecessary control information to efficiently transmit an IP packet such as an IPv4 or IPv6 packet via a radio link having a narrow bandwidth. The header compression function enables transmission of necessary information in a header only, thereby increasing the transmission efficiency of a radio link. In addition, the PDCH layer is responsible for security in the LTE system. This security function involves ciphering for preventing a third part from eavesdropping and integrity protection for preventing a third party from maliciously modifying data.

The RRC layer at the highest of L3 is defined only on the C-plane. The RRC layer takes charge of controlling logical channels, transport channels, and physical channels in relation to configuration, reconfiguration, and release of RBs. An RB is a logical path provided by L1 and L2 in the radio protocol architecture, for data transmission between a UE and a UTRAN. In general, configuring an RB means defining the features of a radio protocol layer and channels needed to provide a specific service and setting specific parameters and an operation scheme. RBs are classified into Signaling RB (SRB) and Data RB (DRB). The SRB is used as a path in which an RRC message is transmitted on the C-plane and the DRB is used as a path in which user data is transmitted on the U-plane.

The methods for conducting communication using a Tx indication at an RN according to the afore-described embodiments of the present invention can be applied to the following HARQ operation.

Figure 15:
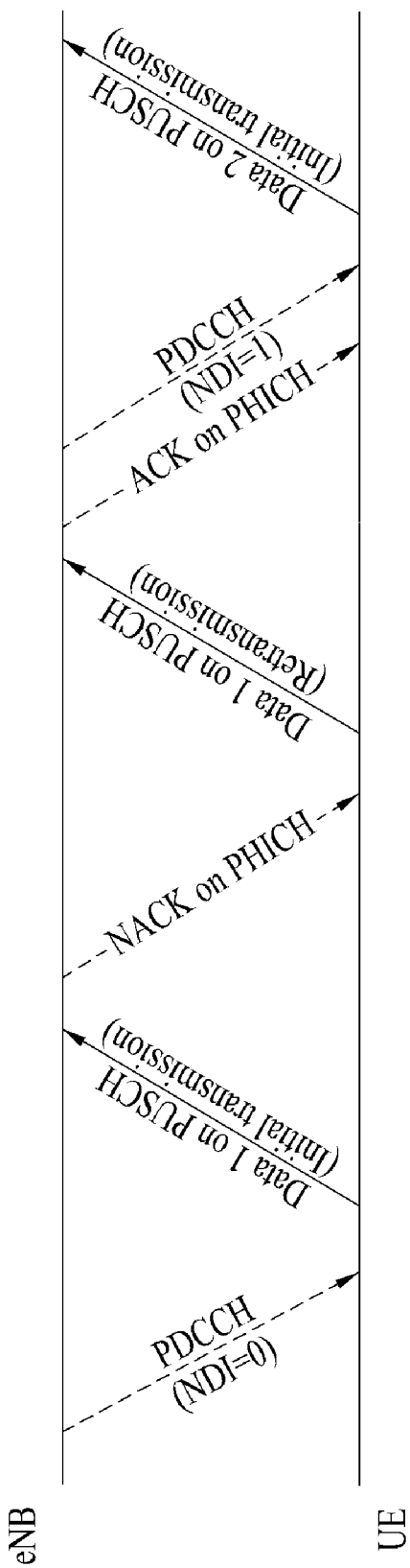
FIG. 15 illustrates an exemplary uplink Hybrid Automatic Repeat reQuest (HARQ) operation.

FIG. 15 illustrates an exemplary uplink HARQ operation.

If the upper node is a DeNB and the lower node is an RN in FIG. 15, FIG. 15 illustrates an uplink HARQ operation on a Un interface. In the opposite case where the upper node is an RN and the lower node is a DeNB in FIG. 15, FIG. 15 illustrates an uplink HARQ operation on a Uu interface. While the following description is given in the context of an uplink HARQ operation on a Uu interface, the same or similar description may be applied to the UL Un.

S1501: the RN may transmit UL scheduling information to a UE on a PDCCH so that the UE can transmit data to the RN by HARQ. In case of the Un interface, the DeNB may allocate UL Un resources to the RN on an R-PDCCH.

The UL scheduling information may include a UE ID (C-RNTI), a resource block assignment for a UE identified by the UE ID, and a Modulation and Coding Scheme (MCS), a Redundancy Version (RV), and a New Data Indication (NDI) as transmission parameters.

S1502: an HARQ entity for managing an HARQ operation exists in the MAC layer of the UE. The HARQ entity may manage a plurality of (8) HARQ processes. The plurality of HARQ processes may operate synchronously in time. That is, each HARQ process may be allocated synchronously in every TTI. For example, HARQ process 1 may be allocated to TTI 1, HARQ process 2 to TTI 2, . . . , HARQ process 8 to TTI 8, HARQ process 1 to TTI 9, and HARQ process 2 to TTI 10. Each HARQ process has an independent HARQ buffer. Because HARQ processes are allocated synchronously in time, upon receipt of a PDCCH for initial transmission of specific data, the HARQ entity may manage an HARQ process related to a received time (TTI) so that the HARQ process may transmit the data. For example, if the UE receives a PDCCH carrying UL scheduling information in TTI N, the UE transmits data in TTI (N+4). In other words, an HARQ process allocated to TTI (N+4) is used for the data transmission. The UE may perform HARQ retransmission non-adaptively. That is, although the UE needs UL scheduling information for initial transmission, it may perform HARQ retransmission using the same UL scheduling information without additional UL scheduling information. If the RN provides additional UL scheduling information for the HARQ retransmission to the UE, the UE may transmit data to the RN using the additional UL scheduling information. After checking UL scheduling information destined for it by monitoring PDCCHs carrying UL scheduling information in each TTI, the UE may transmit data on a PUSCH according to the UL scheduling information. That is, the UE may generate data in the form of a MAC Protocol Data Unit (PDU), stores the MAC PDU in an HARQ buffer, and transmit the MAC PDU to the RN at a transmission time. Then the UE awaits reception of an HARQ feedback for the MAC PDU transmission from the RN.

S1503 and S1504: upon receipt of an HARQ NACK for the MAC PDU from the RN, the UE retransmits the MAC PDU stored in the HARQ buffer at a designated time. That is, if the UE receives the HARQ NACK in TTI N, the UE retransmits the MAC PDU stored in the HARQ buffer of the HARQ process in TTI (N+4). On the contrary, upon receipt of an HARQ ACK from the RN, the UE may discontinue HARQ retransmission of the data. The UE increments a transmission count, CURRENT_TX_NB by 1, each time it transmits data by HARQ. If the transmission count, CURRENT_TX_NB reaches a maximum transmission count set by a higher layer, the UE discards the MAC PDU stored in the HARQ buffer.

S1505: if the UE receives UL scheduling information, the UE can determine whether current data to be transmitted is initial transmission data or retransmission data, from an NDI field included in a PDCCH. The NDI field is 1 bit long. Each time new data is transmitted, the NDI field is toggled between 0 and 1 in the order of 0→1→0→1→ . . . . *For retransmission*, the NDI has the same value as in initial *transmission. That is*, the UE may determine whether data is to be retransmitted by comparing the value of the NDI field with a previous received NDI *value*.

S1506: in the illustrated case of FIG. 15, the UE finds a toggled NDI in the PDCCH received in step S1505 and transmits new data to the RN.

In the above-described UL Uu HARQ operation, data may be received in resources pre-allocated to the RN for UL Uu signal reception. However, when resources are needed in addition to the pre-allocated resources for the HARQ operation, the additional resources may be secured using the aforedescribed Tx indication. The additional resources may be maintained until a corresponding data packet is transmitted.

The above description is applicable to a UL Un HARQ operation.

Figure 16:
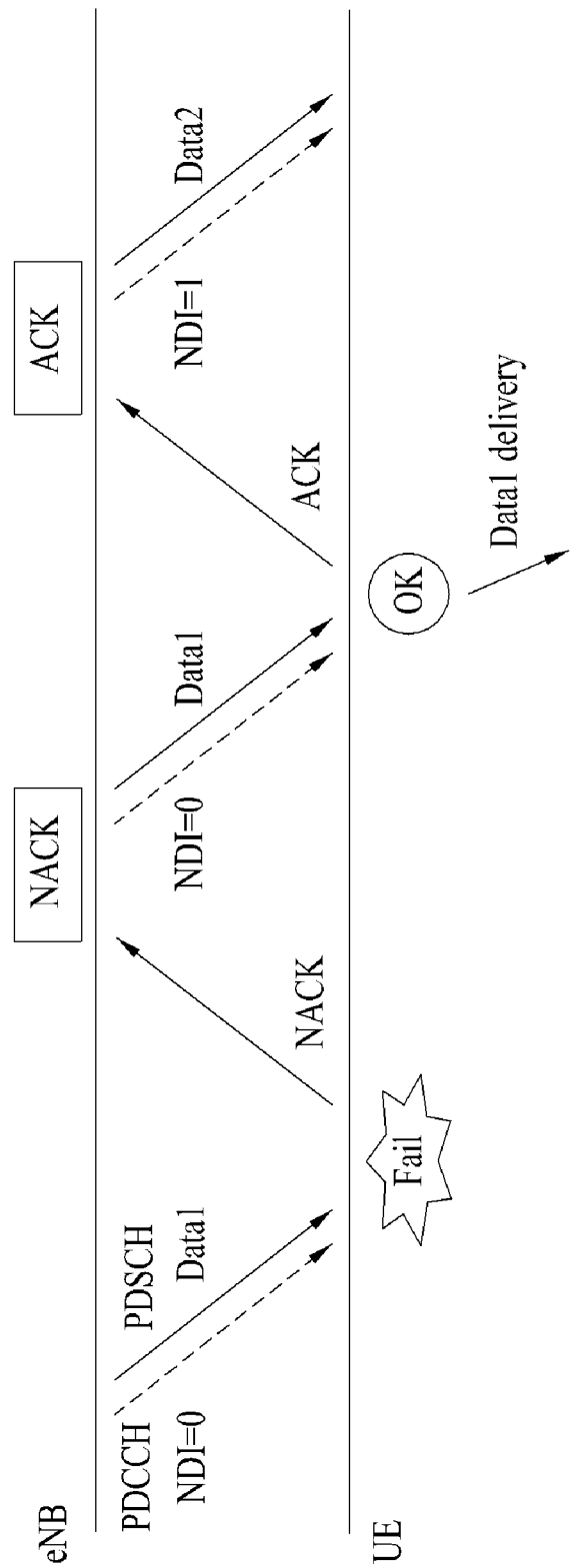
FIG. 16 illustrates an exemplary downlink HARQ operation.

FIG. 16 illustrates an exemplary downlink HARQ operation.

If the upper node is a DeNB and the lower node is an RN in FIG. 16, FIG. 16 illustrates a DL Un HARQ operation. In the opposite case where the upper node is an RN and the lower node is a UE in FIG. 16, FIG. 16 illustrates a DL Uu HARQ operation. While the following description is given in the context of a DL Uu HARQ operation, the same or similar description may be applied to the DL Un.

S1601: the RN may transmit DL scheduling information to a UE on a PDCCH so as to transmit data to the UE by HARQ. The DL scheduling information may include a UE ID or UE group ID, a resource assignment, the duration of the resource assignment, transmission parameters (e.g. a modulation scheme, a payload size, and Multiple Input Multiple Output (MIMO) information), HARQ process information, an RV, and an NDI. For retransmission, DL scheduling information is also delivered on a PDCCH and may vary according to a channel state. For example, if the channel state gets better than at initial transmission, a modulation level or a payload size may be changed to thereby transmit data at a higher bit rate. On the contrary, if the channel state gets poor, data may be transmitted at a lower bit rate than at the initial transmission. The UE may determine whether there is DL scheduling information destined for it by monitoring PDCCHs in each TTI and may receive data from the RN on a PDSCH at a time associated with the PDCCH.

S1602: upon receipt of data, the UE may store the received data in a soft buffer and may attempt to decode the data. The UE may transmit an HARQ feedback to the RN according to the decoding result. That is, the UE may transmit an ACK signal if it has succeeded in decoding and a NACK signal if it has failed in decoding.

S1603: upon receipt of an ACK signal, the RN may transmit the next data, determining that the data transmission to the UE is successful. On the other hand, upon receipt of a NACK signal, the RN may retransmit the same data at an appropriate time in the same format or a new format, determining that the data transmission to the UE has been failed.

S1603, S1604 and S1605: after transmitting the NACK signal, the UE attempts to receive the retransmitted data. The UE may determine from the NDI field included in a PDCCH whether the current data is initial transmission data or retransmission data. As described before, each time new data is transmitted, the NDI field is toggled between 0 and 1 in the order of 0→1→0→1→ . . . . For retransmission, the NDI has the same value as in initial transmission. That is, the UE may determine whether data is to be retransmitted by comparing the value of the NDI field with a previous received NDI value. When the UE receives retransmission data, the UE combines the received data with data which the UE has failed to decode and stored in the soft buffer and attempts to decode the combined data. If the decoding is successful, the UE may transmit an ACK signal to the RN. If the decoding is failed, the UE may transmit a NACK signal to the RN. The UE may repeat the operation for transmitting a NACK signal and receiving retransmission data until it succeeds in decoding the data.

In the above-described DL Uu HARQ operation, data may be transmitted in resources pre-allocated to the RN for DL Uu signal transmission. However, when resources are needed in addition to the pre-allocated resources for the HARQ operation, the additional resources may be secured using the aforedescribed Tx indication. The additional resources may be maintained until a corresponding data packet is transmitted.

The above description is applicable to a DL Un HARQ operation.

The configuration of an RN according to another embodiment of the present invention will be described below.

Figure 17:
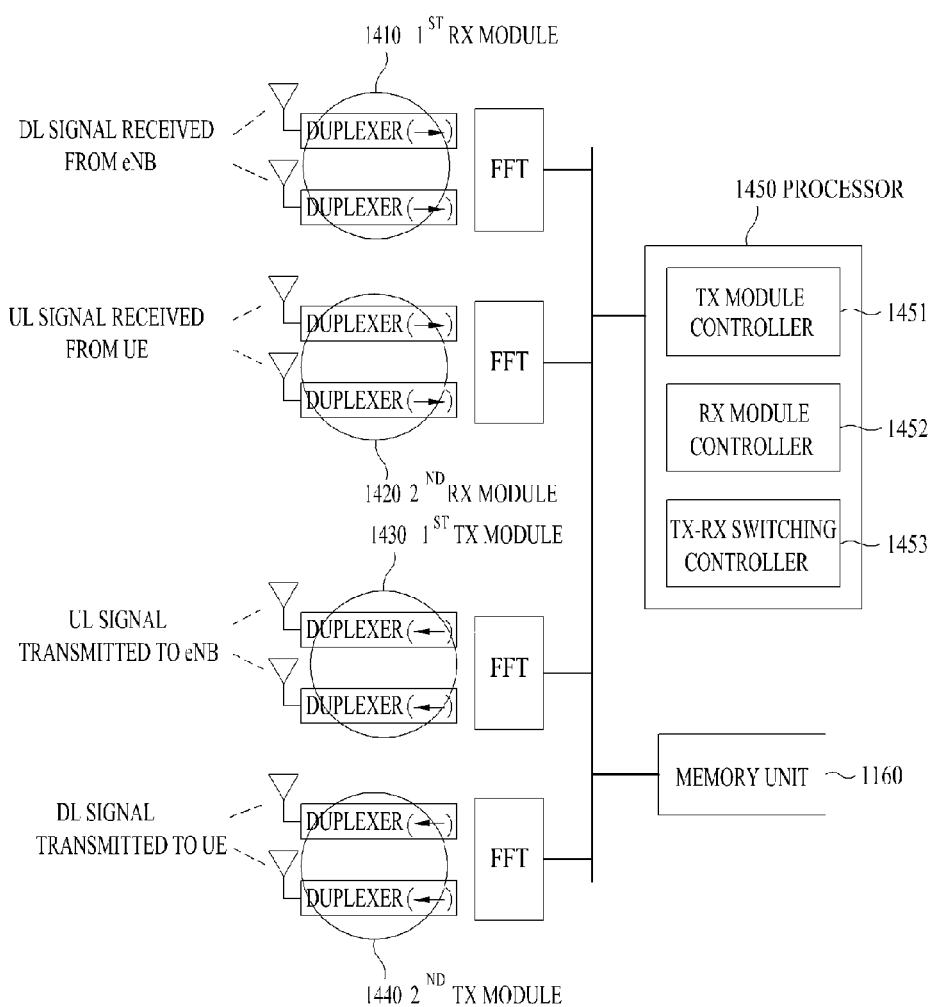
FIG. 17 illustrates function modules in an RN according to an embodiment of the present invention.

FIG. 17 is a block diagram of function modules in an RN according to an embodiment of the present invention.

Compared to an eNB for which only downlink transmission and uplink reception functions are required and a UE for which only downlink reception and uplink transmission functions are required, an RN needs to perform all of downlink reception from an eNB, uplink transmission to an eNB, uplink transmission to a UE, and downlink transmission to a UE. A Tx and Rx unit for this RN may include a first Rx module (for reception on a DL Un) 1410, a second Rx module (for reception on a UL Uu) 1420, a first Tx module (for transmission on a UL Un) 1430, and a second Tx module (for transmission on a DL Uu) 1440. The RN may include a processor 1450. The processor 1450 may be connected to the Rx modules 1410 and 1420 and the Tx modules 1430 and 1440 and may exchange data with them. The processor 1450 may also control the Rx modules 1410 and 1420 and the Tx modules 1430 and 1440. The processor 1450 may include a Tx module controller 1451, an Rx module controller 1452, and a Tx-Rx switching controller 1453. The RN may include a memory unit 1460. The Rx modules 1410 and 1420, the Tx modules 1430 and 1440, the processor 1450, and the memory unit 1460 may exchange data through buses.

Regarding a downlink communication operation of the RN, if a specific DL Uu area is allocated for DL Uu signal reception through the first Rx module 1410, the Tx module controller 1451 of the processor 1450 may control the second Tx module 1440 not to transmit a signal to a UE. In the case where additional resources are allocated for DL Un signal reception through the first Rx module 1410 by a Tx indication, the Tx module controller 1451 may also control the second Tx module 1440 not to transmit a signal to a UE.

The Rx module controller 1452 may control whether to receive a signal through a specific Rx module in the same manner as the above Tx module controller 1451.

The Tx-Rx switching controller 1453 may control a half-duplex RN to switch from a DL Un reception mode to a DL Uu transmission mode or vice versa. Or the Tx-Rx switching controller 1453 may control the half-duplex RN to switch from a UL Un transmission mode to a UL Uu reception mode or vice versa.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described present invention can be used in a variety of wireless communication systems.

The invention claimed is:

1. A method for conducting communication at a Relay Node (RN) in a mobile communication system in which communication is conducted between a Base Station (BS) and the RN via a first interface and between the RN and a User Equipment (UE) via a second interface, the method comprising:

receiving a downlink transmission indication from the BS on a downlink of the first interface;

transmitting a response signal to the BS indicating whether a first signal is to be received from the BS on the downlink of the first interface in a first time area T1 on an uplink of the first interface; and receiving the first signal from the BS on the downlink of the first interface in T1 if the response signal is an ACKnowledgment (ACK) signal, wherein the downlink of the first interface and a downlink of the second interface are in a same frequency band and signal reception on the downlink of the first interface and signal transmission on the downlink of the second interface are not performed simultaneously, wherein a second time area T2 is preliminarily allocated to the RN for signal reception from the BS on the downlink of the first interface, and T1 is a time area other than T2 if the ACK signal is transmitted as the response signal for the downlink transmission indication, and wherein T1 is allocated to the RN by the BS through a downlink transmission indication indicating a time point for receiving the first signal for a synchronous Hybrid Automatic Repeat reQuest (HARQ) operation such that the RN receives the first signal for the synchronous HARQ operation from the BS in T1 on the downlink of the first interface if a time point, at which the first signal is received on the downlink of the first interface for the synchronous HARQ operation of a specific packet transmission between the BS and the RN, is different from T2.

2. The method according to claim 1, wherein the first signal is not received from the BS on the downlink of the first interface if the response signal is a Negative ACK (NACK) signal.

3. The method according to claim 2, wherein transmitting the response signal comprises transmitting the NACK signal to the BS as the response signal if a second signal is supposed to be transmitted to the UE on the downlink of the second interface in T1.

4. The method according to claim 2, wherein transmitting the response signal comprises transmitting the NACK signal to the BS as the response signal if a time at which a second signal is supposed to be transmitted to the UE on the downlink of the second interface in T1 cannot be changed.

5. The method according to claim 1, wherein T2 is preliminarily allocated to the RN, for signal transmission to the UE on the downlink of the second interface, and T1 is a time area changed from a predetermined area of T2 to receive the first signal from the BS on the downlink of the first interface if the ACK signal is transmitted as the response signal for the downlink transmission indication.

6. The method according to claim 1, wherein T2 is a Multimedia Broadcast multicast service Single Frequency Network (MBSFN) subframe area.

7. The method according to claim 1, wherein T1 is allocated by the downlink transmission indication and is used continuously during a time period of the HARQ operation for the specific packet transmission.

8. A method for conducting communication at a Base Station (BS) in a mobile communication system in which communication is conducted between the BS and a Relay Node (RN) via a first interface and between the RN and a User Equipment (UE) via a second interface, the method comprising:

transmitting a downlink transmission indication to the RN on a downlink of the first interface;

receiving a first response signal from the RN indicating whether the RN is to receive a first signal on the downlink of the first interface in a first time area T1 on an uplink of the first interface; and transmitting the first signal to the RN on the downlink of the first interface in T1 if the first response signal is an ACKnowledgment (ACK) signal, wherein the downlink of the first interface and a downlink of the second interface are in a same frequency band and signal transmission from the BS on the downlink of the first interface and signal transmission from the RN on the downlink of the second interface are not performed simultaneously, wherein a second time area T2 is preliminarily allocated to the RN for signal transmission to the RN on the downlink of the first interface, and T1 is a time area other than T2 if the ACK signal is received as the response signal for the downlink transmission indication, and wherein T1 is allocated to the RN by the BS through a downlink transmission indication indicating a time point for transmitting the first signal for a synchronous Hybrid Automatic Repeat reQuest (HARQ) operation such that the BS transmits the first signal for the synchronous HARQ operation to the RN in T1 on the downlink of the first interface if a time point, at which the first signal is transmitted on the downlink of the first interface for the synchronous HARQ operation of a specific packet transmission between the BS and the RN, is different from T2.

9. A Relay Node (RN) apparatus for conducting communication in a mobile communication system in which communication is conducted between a Base Station (BS) and the RN apparatus via a first interface and between the RN apparatus and a User Equipment (UE) via a second interface, the RN apparatus comprising:

an antenna module for receiving a first signal from the BS on a downlink of the first interface, transmitting a second signal to the BS on an uplink of the first interface, receiving a third signal from the UE on an uplink of the second interface, and transmitting a fourth signal to the UE on a downlink of the second interface; and a processor for processing the received first and third signals and the transmitted second and fourth signals, wherein the processor transmits a response signal to the BS indicating whether the first signal is to be received from the BS on the downlink of the first interface in a first time area T1 on the uplink of the first interface in response to receiving a downlink transmission indication from the BS on the downlink of the first interface via the antenna module, wherein the processor receives the first signal from the BS on the downlink of the first interface in T1 if the response signal is an ACKnowledgment (ACK) signal, wherein the downlink of the first interface and a downlink of the second interface are in a same frequency band and signal reception on the downlink of the first interface and signal transmission on the downlink of the second interface are not performed simultaneously, wherein a second time area T2 is preliminarily allocated to the RN apparatus for signal reception from the BS on the downlink of the first interface, and T1 is a time area other than T2 if the ACK signal is transmitted as the response signal for the downlink transmission indication, and wherein T1 is allocated to the RN apparatus by the BS through a downlink transmission indication indicating a time point for receiving the first signal for a synchronous Hybrid Automatic Repeat reQuest (HARQ) operation such that the RN apparatus receives the first signal for the synchronous HARQ operation from the BS in T1 on the downlink of the first interface if a time point, at which the first signal is received on the downlink of the first interface for the synchronous HARQ operation of a specific packet transmission between the BS and the RN apparatus, is different from T2.

10. A Base Station (BS) apparatus for conducting communication in a mobile communication system in which communication is conducted between the BS apparatus and a Relay Node (RN) via a first interface and between the RN and a User Equipment (UE) via a second interface, the BS apparatus comprising:

an antenna module for transmitting a first signal to the RN on a downlink of the first interface and receiving a second signal from the RN on an uplink of the first interface; and a processor for processing the received second signal and the transmitted first signal, wherein the processor transmits a downlink transmission indication to the RN on the downlink of the first interface, and receives a response signal from the RN indicating whether the RN is to receive the first signal on the downlink of the first interface in a first time area T1 to be received from the RN on the uplink of the first interface, wherein the processor transmits the second signal to the RN on the downlink of the first interface in T1 if the response signal is an ACKnowledgment (ACK) signal, wherein the downlink of the first interface and a downlink of the second interface are in a same frequency band and signal transmission from the BS apparatus on the downlink of the first interface and signal transmission from the RN on the downlink of the second interface are not performed simultaneously, wherein a second time area T2 is preliminarily allocated to the RN for signal transmission to the RN on the downlink of the first interface, and T1 is a time area other than T2 if the ACK signal is received as the response signal for the downlink transmission indication, and wherein T1 is allocated to the RN by the BS apparatus through a downlink transmission indication indicating a time point for transmitting the first signal for a synchronous Hybrid Automatic Repeat reQuest (HARQ) operation such that the BS apparatus transmits the first signal for the synchronous HARQ operation to the RN in T1 on the downlink of the first interface if a time point, at which the first signal is transmitted on the downlink of the first interface for the HARQ operation of a specific packet transmission between the BS apparatus and the RN, is different from T2.

* * * * *